(12) United States Patent
Kim

(10) Patent No.: US 11,837,854 B2
(45) Date of Patent: Dec. 5, 2023

(54) SLEEVE PROTECTOR FOR WIRES

(71) Applicant: ELECTRIC SOLUTIONS CO., LTD., Chungcheongnam-do (KR)

(72) Inventor: Gun-Hwan Kim, Seoul (KR)

(73) Assignee: ELECTRIC SOLUTIONS CO., LTD., Chungcheongnam-Do (KR)

( * ) Notice: Subject to any disclaimer, the term of this patent is extended or adjusted under 35 U.S.C. 154(b) by 247 days.

(21) Appl. No.: 17/615,709

(22) PCT Filed: Nov. 14, 2019

(86) PCT No.: PCT/KR2019/015523
§ 371 (c)(1),
(2) Date: Dec. 1, 2021

(87) PCT Pub. No.: WO2021/095922
PCT Pub. Date: May 20, 2021

(65) Prior Publication Data
US 2022/0344917 A1    Oct. 27, 2022

(30) Foreign Application Priority Data
Nov. 14, 2019   (KR) .......................... 10-2019-0145494

(51) Int. Cl.
*H02G 3/04*      (2006.01)

(52) U.S. Cl.
CPC ................................ *H02G 3/0406* (2013.01)

(58) Field of Classification Search
CPC ............................... H02G 3/0406; H02G 3/04
USPC ........................................................ 174/68.1
See application file for complete search history.

(56) References Cited

FOREIGN PATENT DOCUMENTS

| | | |
|---|---|---|
| JP | H099454 | 1/1997 |
| JP | 2002075098 | 3/2002 |
| KR | 200207939 | 1/2000 |
| KR | 20160069295 | 6/2016 |

*Primary Examiner* — Tremesha S Willis
(74) *Attorney, Agent, or Firm* — IPLA P.A.

(57) ABSTRACT

A sleeve protector for wires, includes: a hollow cover which has a slit formed along the center line of the bottom thereof in order to cover a wire with the cover by opening the cover in the opposite directions and then placing the cover on the wire; a pair of hook-shaped jaws which protrude longitudinally from the lower inner circumferential surface of the cover along the opposite sides of the slit, respectively; a fastener which is formed to fasten the cover by being fitted onto the pair of jaws in order to maintain the slit in a closed state after the wire is covered with the cover, and has a tab integrated therewith, the tab being formed along the center line of the fastener and exposed out of the cover through the slit; and a pair of guards which are integrated with the cover.

6 Claims, 4 Drawing Sheets

SLEEVE PROTECTOR FOR WIRES

BACKGROUND

The present invention relates to a protection pipe for distribution lines used to prevent the risk of electric shock and line failure due to contact with foreign objects when working with trees or high-voltage live wires or the like, and more particularly to a sleeve protector for wires, in which fastened parts and a fastened state can be prevented from being automatically unfastened or released due to thermal deformation and leakage current blocking performance and dielectric strength can be improved.

Transmission lines (overhead distribution lines) are mainly installed on pylons or electric poles to safely transmit electricity from substations near cities to consumers who use electricity such as homes, buildings, and factories.

In the case of a wooded area such as a mountainous area or a road lined with trees, when these transmission lines come into contact with the trees as the trees grow, power outages, wiring failures, and facility failures may occur frequently, resulting in excessive costs in maintenance management.

When working with a live-line or working near a live-line while high-voltage electricity is flowing through the transmission line, there is a very high risk of electric shock due to worker's carelessness, such as contact with the live-line. In addition, if the transmission line is installed close to a building, damage such as wiring failures or danger such as electric shock may occur due to contact with foreign objects and impact during construction.

In order to prevent the damage or danger, a protective pipe (insulation protective gear) that covers and insulates a part of such a transmission line has been widely used, wherein a plurality of protective pipes may be used with additional connector depending on the site conditions and circumstances.

For example, there is a protective cover disclosed in Korean Patent Registration No. 10-1681150, including an upper body, which is open in the center of the bottom thereof and has a hollow part into which a messenger wire is inserted, and a plurality of contact protrusions formed in the longitudinal direction on the inner circumferential surface of the hollow part, and a pair of lower bodies, which are formed extending from the lower end of the upper body so as to face each other and respectively have fastening holes formed at regular intervals in the longitudinal direction.

However, this prior art has problems of electric shock as well as insulation failure and insulation breakdown in the case where a messenger wire (a transmission line) is composed of a bare wire that is not insulated or covered with vinyl, rubber, etc., unlike general wires, since when rainwater penetrates into the inside through the gap between parts where protective pipes are in contact with each other and the gap between the facing parts of binding connectors, leakage currents flowing through the rainwater have a very high risk of causing an electric shock and accumulation of stress such as deterioration and deformation gradually degrades insulation, i.e. dielectric strength.

In addition, this prior art has a further problem in that since the locking parts of the lower body, which face each other, are exposed to the outside, thermal deformation occurs due to sunlight, ultraviolet rays or the like, which causes an inlet part to open or loosen by itself, resulting in the separation from the transmission line.

In addition, there are further prior art disclosed in Japanese Utility Model Publication No. 6-66246, U.S. Pat. No. 6,730,852, and the like.

On the other hand, with the rise of the risk of electric shock from the direct live-line work, in which power is supplied without interruption during various electrical works for inspection, maintenance, relocation (replacement) or the like of overhead distribution lines, the indirect live-line working method has been recently introduced to ensure safety by minimizing the worker's working in contact with a live-line and near a live-line, wherein a worker performs various tasks without direct contact such as touching a live-line with hands but by using the so-called smart stick/insulating stick even in a live-line state.

Smart sticks used in this indirect live-line working method include a grip-all clamp stick, which holds a jumper wire when connecting the jumper wire or holds a wire when the wire vibrates during live-line work, a hook stick used for installation, removal and handling of various parts with clamps and holes, a pliers stick for holding, fixing or removing various small objects, and a wire holding stick used for holding a jumper wire or a conductor in a wire connection process. In addition, smart sticks such as a tie stick, a rotary prong, a wire tong or the like are also available.

It should be noted that the background or prior art described herein is information possessed by the inventor or acquired in the process of deriving the present invention, is only intended to help in understanding the technical meaning of the present invention, and does not mean techniques widely known in the art to which the present invention belongs prior to the filing of the present invention.

SUMMARY OF THE INVENTION

Therefore, the present inventor has made great effort to solve the technical limitations and problems of the existing wire protection tubes, comprehensively considering all the above, and finally created a sleeve protector for wires with a new structure in the midst of continuous research, in which leakage current blocking performance and dielectric strength are improved so that it is possible to prevent insulation defects caused by stress such as deterioration and deformation, prevent electric shock, and prevent fastened parts and a fastened state from being automatically unfastened or released due to thermal deformation.

The present invention has been derived to solve the problems of the prior art described above, and has an objective to provide a sleeve protector for wires, which can completely block the current flowing in a wire from leaking through inflowing rainwater as a passage.

In addition, another objective of the present invention is to provide a sleeve protector for wires, which can reliably prevent fastened parts and a fastened state from being automatically unfastened or released by thermal deformation.

Herein, the technical problems to be solved by the present invention and the objectives of the present invention are not limited to those mentioned above, and other technical problems and objectives not mentioned would be clearly understood by those skilled in the art from the following description.

According to one aspect of the present invention in order to achieve the objectives described above and solve the technical problems, there is provided a sleeve protector for wires, including a hollow cover having a slit formed in the center part of the bottom thereof so as to cover a wire by opening the hollow cover in the opposite directions, a pair of hook-shaped jaws, which are formed at both sides of the slit in the longitudinal direction on the lower inner circumferential surface of the cover and protrude in the shape of a hook in cross-section, a fastener, which is formed in a shape corresponding to that of the pair of hook-shaped jaws so as to be fitted onto and fasten the pair of hook-shaped jaws after the wire is covered with the cover, in order to maintain the slit in a closed state, and has a tab integrally formed in the center portion so as to be exposed to the outside through the slit, and a pair of guards, which are integrated with the cover and extend from the opposite portions on the bottom of the cover, respectively, in order to open or close the cover in the opposite directions and protect the tab of the fastener, and have a distance between each other that gradually increases outwards from the bottom portions.

Therefore, according to the present invention, unlike the prior art, the fastened parts are not exposed to the outside so that the fastened state can be reliably prevented from being automatically unfastened or released by thermal deformation. In addition, the leakage current of a wire is insulated and blocked so as not to flow directly in the downward direction through the passage of rainwater, moisture or the like penetrating inside but to maintain high electrical insulation, thereby preventing insulation defects caused by stress such as deterioration, deformation or the like and preventing electric shock accidents.

In addition, according to the present invention, the cover is formed in the shape of a slot hole in cross-section so that a wire is positioned at the upper portion therein and has an air space part formed at the lower portion therein so as to block the current of the wire from leaking directly in the downward direction and to maintain dielectric strength with air insulation, thereby stably maintaining Insulation performance through smooth air circulation.

Furthermore, according to the present invention, the air space part has a plurality of leakage prevention protrusions formed at regular intervals on the inner circumferential surface thereof so as to induce the leakage current of the wire not to flow directly in the downward direction through rainwater flowing in from the outside and to block the current of the wire from leaking directly in the downward direction, so that the leakage of current can be reliably blocked over again and insulation failure due to stress such as deterioration and deformation can be prevented.

In addition, according to the present invention, the leakage prevention protrusions are formed to protrude inward in such a manner that the leakage prevention protrusions gradually increase in protruding length from the upper part of the cover toward the slot in order to increase a leakage distance, thereby maximizing insulation performance.

According to the present invention, the pair of hook-shaped jaws are formed symmetrically with each other on both sides of the lower inner circumferential surface of the cover on the basis of the slit, and the fastener has a head formed at the upper end of the tab in a shape corresponding to the shape of the pair of hook-shaped jaws so that the head is fitted between the lower inner circumferential surface of the cover and the pair of hook-shaped jaws and wraps the pair of hook-shaped jaws and the tab comes in close contact with the slit.

Moreover, according to the present invention, the tab has a plurality of first holes formed at regular intervals so that a hook of a smart stick is held in the hole, and the guard has an anti-slip, uneven surface to be picked up by the tongs of a smart stick in order to open or close the cover in the opposite directions and a plurality of holes formed at regular intervals in the longitudinal direction thereof so as to hold the hook of a smart stick therein, thereby improving convenience and ease of operation.

According to the first aspect of the present invention with means and configuration for achieving the above objectives and solving the technical problems, the fastened parts are not exposed to the outside, that is, the fastener has a structure that fastens the jaws without a gap therebetween inside the cover by being engaged with the both side jaws of the cover, so that the jaws can be reliably prevented from being released from the fastened state or opened by themselves due to thermal deformation.

In addition, the air space part maintains the air insulation performance stably due to the smooth circulation of air and the leakage prevention protrusions have a double structure that extends a creeping distance so as to improve the dielectric strength but also to insulate and block the leakage current of a bare wire from flowing directly in the downward direction through the passage of rainwater, moisture or the like, thereby maintaining high electrical insulation.

Therefore, it is possible not only to prevent an electric shock accident due to the leakage current flowing through rainwater as a passage, but also to reliably prevent insulation failure due to stress such as deterioration and deformation.

Herein, the effects of the present invention are not limited to the above-mentioned effects, and other effects not mentioned will be clearly understood by those skilled in the art from the description of the claims.

DETAILED DESCRIPTION OF THE INVENTION

Figure 1:
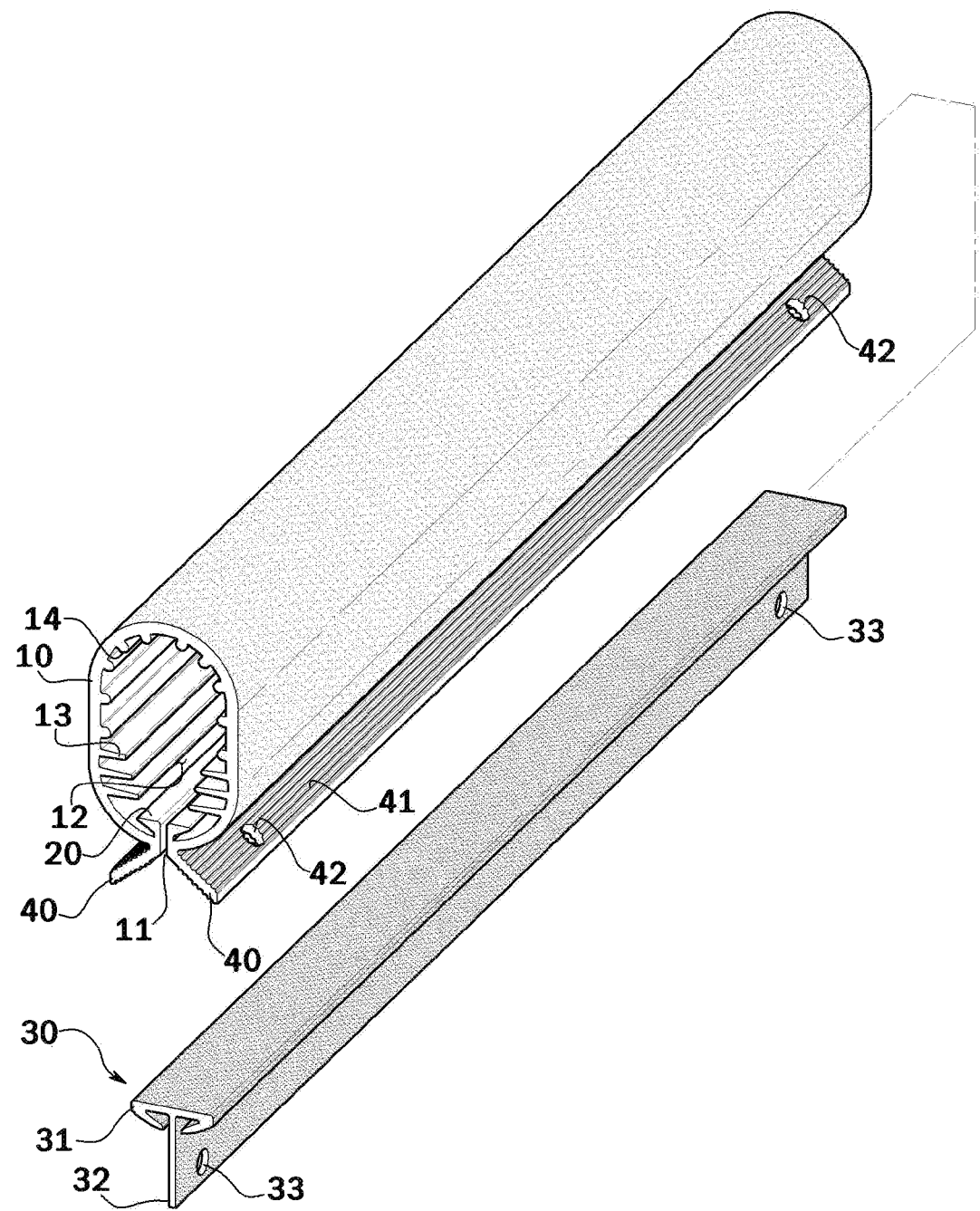
FIG. 1 is an exploded perspective view showing a sleeve protector for wires according to an embodiment of the present invention.
Figure 2:
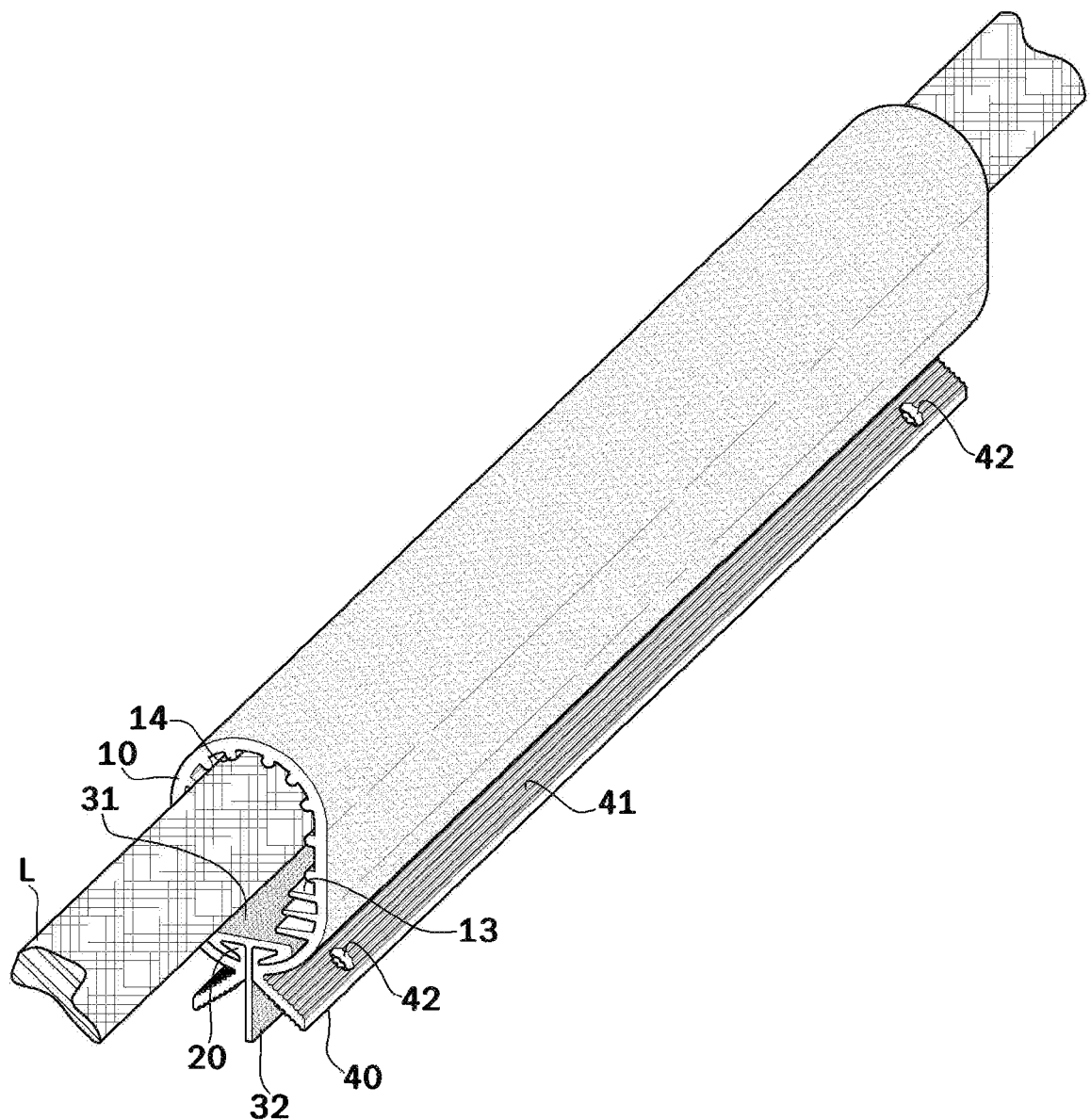
FIG. 2 is a perspective view showing a state in which the sleeve protector for wires according to the embodiment of the present invention is installed on a wire.
Figure 3:
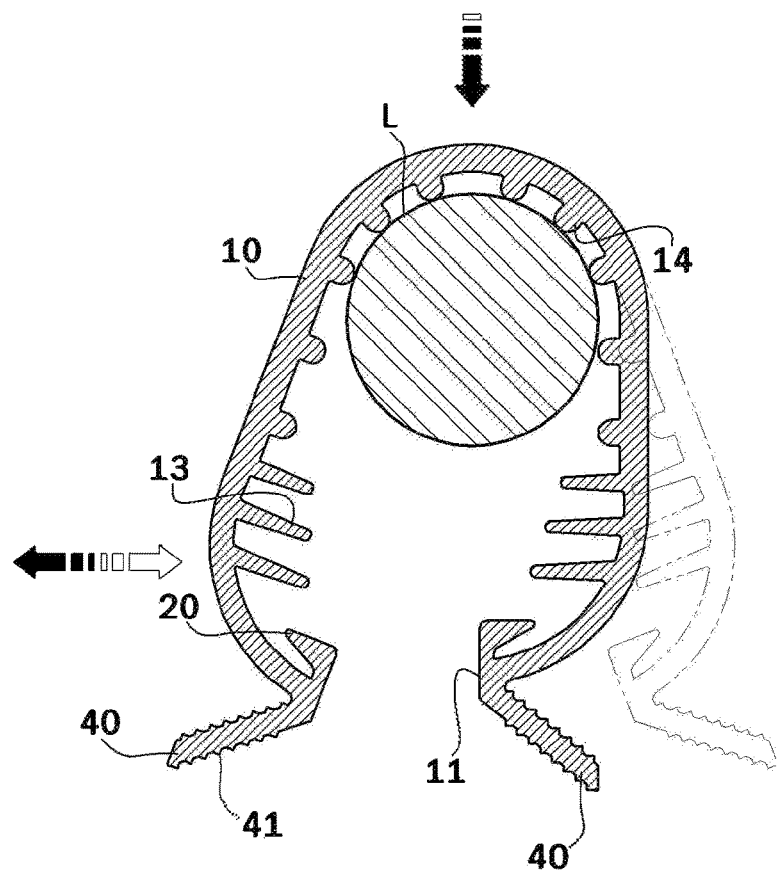
FIG. 3 is a cross-sectional view for explaining the process of installing the sleeve protector for wires according to the embodiment of the present invention on a wire.
Figure 4:
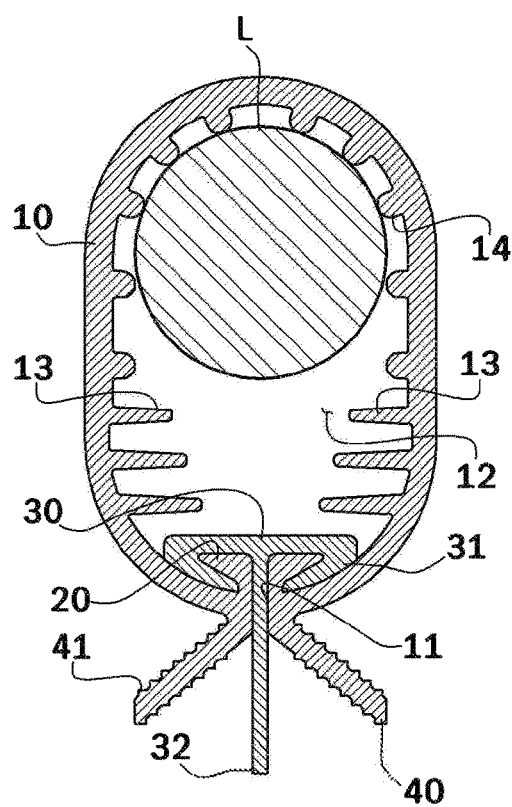
FIG. 4 is a cross-sectional view showing a state in which the sleeve protector for wires according to an embodiment of the present invention is installed on a wire.

Hereinafter, embodiments of the present invention will be described in detail with reference to the accompanying drawings. Prior to this, it should be noted that the terms mentioned hereinafter are defined in consideration of the functions in the present invention and should be interpreted as the concepts consistent with the technical idea of the present invention and meaning commonly used or recognized in the art.

In addition, if it is determined that a detailed description of a known function or configuration related to the present invention may obscure the gist of the present invention, the detailed description thereof will be omitted.

In the accompanying drawings, parts are exaggerated or simplified for convenience and clarity of explanation and understanding of the configuration and operation of the technology, and it can be seen that each component may not exactly correspond to actual size and shape.

In addition, it should be understood that, as used herein, the term "and/or" is meant to include any combination of a plurality of listed items or any of a plurality of listed items, and when it is said that a part includes a certain component, this means that other components may be further included, rather than excluded, unless otherwise stated.

That is, it should be understood that it means that there are features, numbers, steps, operations, elements, parts, or combinations thereof described herein, the possibility of the existence or addition of one or more other features, numbers, steps, operations, elements, parts, or combinations thereof is not excluded.

It should also be understood that terms such as upper end, lower end, top surface, bottom surface, or upper portion, lower portion, upper side, lower side, etc. are used for convenience to distinguish relative positions of each component. For example, the upper side in the drawings may be named and referred to as the upper part and the lower side in the drawings may be named and referred to as the lower part.

In addition, it should be noted that terms such as first, second, etc. may be used to describe various components. That is, terms such as first, second, etc. may be used only for the purpose of distinguishing one component from another. For example, a first component may be named as a second component as long as it does not depart from the scope of protection of the present invention, and the second component may also be named as the first component.

A sleeve protector for wires according to an embodiment of the present invention may be made of a material such as a polymer insulating material, a flexible synthetic resin, synthetic rubber, etc. having a certain length and elasticity so as to be installed around a wire, thereby preventing an electric shock accident.

Herein, the polymer insulating material may include, for example, any one of polyurethane resin, non-crosslinked polypropylene, polyisocyanurate, polyamideimide, fluororesin, or a mixture thereof.

As shown in FIG. 1 to FIG. 4, a sleeve protector for wires according to an embodiment of the present invention includes a cover 10, jaws 20, a fastener 30, and guards 40.

The cover 10 is formed in a hollow shape, in which the inner diameter of the cover 10 is slightly larger than the outer diameter of a wire L so that the cover 10 spreads on both sides and covers the wire L as if the cover 10 wraps the wire L. The cover 10 is divided into left and right sides in the center of the bottom, so that a slit 11 is formed in a narrow and long shape in the longitudinal direction so as to serve as an exit for the wire L.

In other words, the cover 10 is formed in the shape of a slot hole so that the lower part of the cover 10 is spread on both sides based on the slit 11 and the wire L is positioned in close contact with the upper portion of the cover 10 inside the cover 10.

In addition, the cover 10 has an air space part 12, which is formed at the lower portion therein so as to block the current of the wire L from leaking directly in the downward direction and to maintain dielectric strength with air insulation.

That is, the air space part 12 forms an air layer with a low dielectric constant and induces smooth air circulation, thereby obtaining dielectric strength and air insulation effects. In addition, by forming the air space part 12, it is possible to realize cost reduction and weight reduction by reducing materials, as well as increase flexibility, thereby facilitating installation in a curved section and ensuring the ease of operation.

In addition, the air space part 12 not only induces foreign substances such as rainwater, moisture or the like introduced from the outside to be discharged quickly and smoothly, but also facilitates volume change due to expansion at a high temperature or contraction at a low temperature, so that the cover 10 can minimize the occurrence of cracks due to repeated expansion and contraction according to seasonal temperature changes.

Furthermore, the air space part 12 has a plurality of leakage prevention protrusions 13 formed at regular intervals in the circumferential direction, wherein the leakage prevention protrusions 13 induce the leakage current of the wire L not to flow directly in the downward direction through rainwater introduced from the outside, thereby blocking the leakage current of the wire L from flowing directly in the downward direction.

Here, in order to maximize the leakage distance, the leakage prevention protrusions 13 protrude inward and are provided in the longitudinal direction, wherein the leakage prevention protrusions 13 gradually increase in protruding length from the upper part of the cover 10 toward the slot 11 in the bottom of the cover 10.

That is, the leakage prevention protrusions 13 protrude on the opposite walls in the air space part 12 so that the leakage prevention protrusions 13 increase the creeping distance and prevent the rainwater from moving along the inner walls of the air space part 12, thereby naturally blocking the passage of electric current.

In addition, the leakage prevention protrusions 13 can improve strength, hardness and rigidity, thereby preventing the structurally unstable state of the cover 10 due to stress such as bending deformation.

Meanwhile, a plurality of semi-circular contact protrusions 14 are formed at regular intervals in the circumferential direction on the upper inner circumferential surface of the cover 10 so as to elastically come into close contact with the upper outer circumferential surface of the wire L.

Grooves are naturally formed between these contact protrusions 14 and suppress the concentration of electric fields while maintaining dielectric strength so that it is possible to prevent deterioration and improve durability. In addition, it is possible to quickly and smoothly discharge foreign substances such as moisture.

Herein, the cover 10 can be formed in various sizes according to the thickness and size of the wire L, and employ an appropriate size corresponding to the thickness and size of the wire L.

In addition, the wire L may be an insulating wire in which the outside of the spiral made of a conductor such as copper or aluminum is surrounded by an insulating material such as vinyl, rubber, or enamel, or a bare wire in which the outside of the spiral is not insulated or coated.

A pair of jaws 20 are formed at both sides of the slit 11 on the lower inner circumferential surface of the cover 10 so as to maintain the gap of the slit 11 in a blocked and closed state through the fastening of the fastener 30 that is engaged with the pair of jaws 20 in a state, where the cover 10 covers the wire L.

In other words, the pair of hook-shaped jaws 20 are formed to face each other symmetrically with respect to the slit 11 and protrudes in the longitudinal direction of the cover 10 in a hook-shaped cross section.

In order to maintain the slit 11 in a closed state after covering the wire L with the cover 10, the fastener 30 is formed in the shape of a "T" and fitted onto the pair of hook-shaped jaws 20, thereby fastening the pair of hook-shaped jaws 20.

The fastener 30 has a tab 32 integrally formed in the center, and the tab 32 has an upper end fitted into the slit 11 so as to be in close contact therewith and a lower end penetrating the slit 11 so as to be exposed to the outside.

In addition, the tab 32 has a head 31 integrally formed on top of the tap 32 and, while surrounding the pair of hook-shaped jaws 20, the head 31 is inserted between the lower inner circumferential surface of the cover 10 and the pair of hook-shaped jaws 20 in a forced fitting manner, so that the tab 32 can be in close contact with the slit 11.

In addition, the fastener 30 is formed in a cross-sectional shape, in which male and female shapes correspond to and are coupled to each other in order to maintain the closed state of the slit 11 while blocking the gap of the slit 11 and to maintain the cover 10 around the wire L stably.

In other words, in order to prevent the fastener 30 from moving in the slit 11 rather than being in close and stable contact with the slit 11 due to the gap of the slit 11 as well as to prevent leakage current from flowing through the slit 11, the cross section of the fastener 30 is formed in a shape corresponding to the cross section formed by the pair of hook-shaped jaws 20 and the slit 11.

In addition, in order to easily remove the fastener 30 from the jaws 20 and the slit 11 by hooking the cover 10 with a smart stick when separating the cover 10 from the wire L, the tab 32 has a plurality of first holes 33 formed at regular intervals.

The guards 40 are integrated with the cover 10 and extend a certain length from the opposite bottom portions of the cover 10, respectively, so as to open or close the bottom of the cover 10 in the opposite directions based on the slit 11 or to protect the tab 32 of the fastener.

In more detail, the guards 40 have a predetermined length and width from the bottom of the cover 10 toward the outside, wherein a pair of left and right guards 40 are provided in the longitudinal direction and form an inverted v-shape (that is, "/\" shape) as the distance between them gradually increases toward the outside.

Meanwhile, in order to stably open or close the bottom of the cover 10 by picking up the guards 40 with the tongs of a smart stick when covering the wire L with the cover 10 or removing the cover 10 from the wire L, the guards 40 have anti-slip irregularities 41 formed on the surfaces thereof.

Furthermore, in order to stably open or close the bottom of the cover 10 by hooking the guards 40 with the hook of a smart stick when covering the wire L with the cover 10 or removing the cover 10 from the wire L, the guards 40 have a plurality of second holes 42 formed at regular intervals in the longitudinal direction thereof.

In the sleeve protector for wires according to the embodiment of the present invention configured in this way, after the bottom of the cover 10 is opened on both sides by pinching the guards 40 with the tongs of a smart stick or hooking the guards 40 with the hook of a smart stick and then the wire L is covered with the cover 10, it is possible to close the slit 11 and at the same time maintain the slit 11 in the closed state by fitting the fastener 30 between the jaws 20 and the slit 11.

Herein, since the cover 10 elastically opens by elasticity when an external force is applied thereto and contracted to its original state when the external force is removed, the cover 10 can naturally wrap and cover the wire L. In addition, due to the strong locking action of the fastener 30, the cover 10 can be stably fixed around the wire L without a gap in the slit 11.

The air space part 12 carries out air insulation, and the leakage prevention protrusions 13 have a structure that extends the creeping distance. Therefore, even if rainwater or moisture penetrates into the air space part 12, it is possible to block the leakage current of the wire from flowing directly in the downward direction through the rainwater or moisture as a passage, thereby maintaining high electrical insulation. In addition, even if an operator accidentally touches the cover, it is possible to prevent an electric shock accident.

Figure 5:
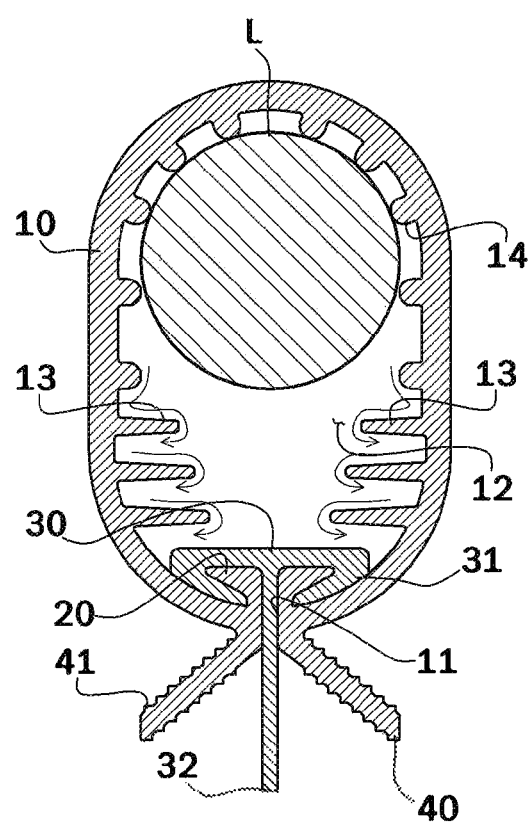
FIG. 5 is a cross-sectional view for explaining the operation of the sleeve protector for wires according to the embodiment of the present invention.

More specifically, in the sleeve protector for wires according to the embodiment of the present invention as shown in FIG. 5, even if rainwater enters from the outside along the wire L and flows down along the inner circumferential surface of the cover 10 directly in the downward direction (in the direction of arrows), the rainwater is blocked by the leakage prevention protrusions 13 and is condensed at the ends of the leakage prevention protrusions 13. Then, the rainwater falls down and is discharged, without being collected inside, to the outside through openings at both end portions in the longitudinal direction. Accordingly, the passage of current can be naturally cut off.

In addition, the air insulation function is improved owing to the air space part 12, and the creeping distance, that is, the leakage distance is increased to 90 mm or more owing to the leakage prevention protrusions 13. Therefore, the leakage current does not flow down through the slit 11 and is diverted so that it is possible to maximize dielectric strength and electrical insulation and reliably prevent deterioration, burnout or insulation breakdown due to moisture penetration and leakage current.

Moreover, the fastened part of the cover 10 is not exposed to the outside, that is, the fastened part of the cover 10 is maintained by the fastener 30 which has the structure, in which the fastener 30 is engaged with the pair of hook-shaped jaws 20 at the same time inside the cover 10, thereby fastening the pair of hook-shaped jaws 20 more firmly and airtightly without any gaps. Therefore, owing to the excellent binding force, it is possible to reliably prevent the pair of hook-shaped jaws 20 from being unfastened or released from the fastened state thereof by themselves due to thermal deformation.

Meanwhile, it would be clear to those of ordinary skill in the art to which the present invention belongs that the present invention is not limited to the above-described embodiments and the accompanying drawings and may be variously modified and applied in various ways that are not illustrated herein within the scope of the present invention without departing from the technical spirit of the present invention. Also, it would be clear to those of ordinary skill in the art to which the present invention belongs that the present invention can be widely applied by replacing each component and employing other equivalent embodiments.

Accordingly, modification and application of the technical features of the present invention should be construed as being included in the technical spirit and scope of the present invention.

The present invention can be used as an insulating protective device in the field of electricity and electricity transmission, such as a protective pipe that insulates a transmission line, by covering a part of the transmission line in order to prevent the risk of line failure and electric shock due to contact with foreign objects when working with trees or high-voltage live wires or the like.

What is claimed is:

1. A sleeve protector for wires, comprising:
  a hollow cover having a slit for dividing the center part of the bottom thereof in the longitudinal direction so as to cover a wire by opening the hollow cover in the opposite directions;

a pair of hook-shaped jaws, which are formed on the both sides of the slit on the lower inner circumferential surface of the cover and protrude in the shape of a hook in cross-section;

a fastener, which is formed so as to be fitted onto and fasten the pair of hook-shaped jaws in order to maintain the slit in a closed state after the wire is covered with the cover, and has an upper end fitted into the slit so as to be in close contact with the slit and a lower end having a tab integrally formed in the center portion so as to be exposed to the outside through the slit; and a pair of guards, which are integrated with the cover and extend from opposite sides of the bottom of the cover, respectively, in order to open or close the bottom of the cover in the opposite directions or protect the tab of the fastener, and have a distance between each other that gradually increases outwards.

2. The sleeve protector for wires according to claim 1, wherein the cover is formed in the shape of a slot hole in cross-section so that a wire is positioned at the upper portion therein and has an air space part formed at the lower portion therein so as to block the current of the wire from leaking directly in the downward direction and to maintain dielectric strength with air insulation.

3. The sleeve protector for wires according to claim 2, wherein the air space part has a plurality of leakage prevention protrusions formed at regular intervals on the inner circumferential surface thereof so as to induce the leakage current of the wire not to flow directly in the downward direction through rainwater flowing in from the outside, thereby blocking the current of the wire from leaking directly in the downward direction.

4. The sleeve protector for wires according to claim 3, wherein the leakage prevention protrusions are formed to protrude inward in such a manner that the leakage prevention protrusions gradually increase in protruding length from the upper part of the cover toward the slot in order to increase a leakage distance.

5. The sleeve protector for wires according to claim 1, wherein the pair of hook-shaped jaws are formed symmetrically with each other on both sides of the lower inner circumferential surface of the cover on the basis of the slit, the fastener has a head formed at the upper end of the tab in a shape corresponding to the shape of the pair of hook-shaped jaws so that the head is fitted between the lower inner circumferential surface of the cover and the pair of hook-shaped jaws and wraps the pair of hook-shaped jaws and the tab comes in close contact with the slit, and the tab has a plurality of first holes formed at regular intervals so that a hook of a smart stick is held in the first hole.

6. The sleeve protector for wires according to claim 1, wherein the guard has an anti-slip, uneven surface to be picked up by the tongs of a smart stick in order to open or close the cover in the opposite directions, and a plurality of second holes formed at regular intervals in the longitudinal direction so as to hold the hook of a smart stick.

* * * * *